Figure 1:
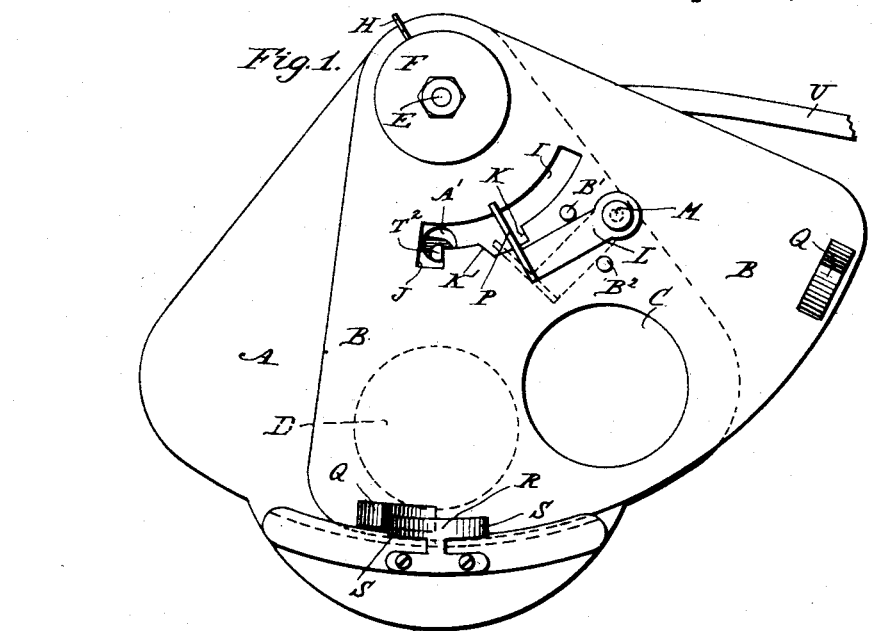

(No Model.) 2 Sheets—Sheet 1.
W. H. LEWIS.
PHOTOGRAPHIC SHUTTER.

No. 437,655. Patented Sept. 30, 1890.

WITNESSES:
D. C. Reusch.
F. C. Smith.

INVENTOR
William H Lewis
BY Phillips Abbott
his ATTORNEY (No Model.) 2 Sheets—Sheet 2.

W. H. LEWIS.
PHOTOGRAPHIC SHUTTER.

No. 437,655. Patented Sept. 30, 1890.

WITNESSES:
D. C. Reusch
F. C. Smith

INVENTOR:
William H Lewis
BY Phillips Abbott
his ATTORNEY

UNITED STATES PATENT OFFICE.

WILLIAM H. LEWIS, OF HUNTINGTON, ASSIGNOR TO THE E. & H. T. ANTHONY & COMPANY, OF NEW YORK, N. Y.

PHOTOGRAPHIC SHUTTER.

SPECIFICATION forming part of Letters Patent No. 437,655, dated September 30, 1890.

Application filed February 8, 1890. Serial No. 339,678. (No model.)

*To all whom it may concern:*

Be it known that I, WILLIAM H. LEWIS, a citizen of the United States, and a resident of Huntington, in the county of Suffolk and State of New York, have invented certain new and useful Improvements in Photographic Shutters, of which the following is a specification.

My invention relates to improvements in photographic shutters; and it consists in the construction and arrangement of the parts substantially as hereinafter described and shown, or the mechanical equivalents of the same.

In the drawings the same reference-letters indicate the same parts in all the figures.

Figure 2:
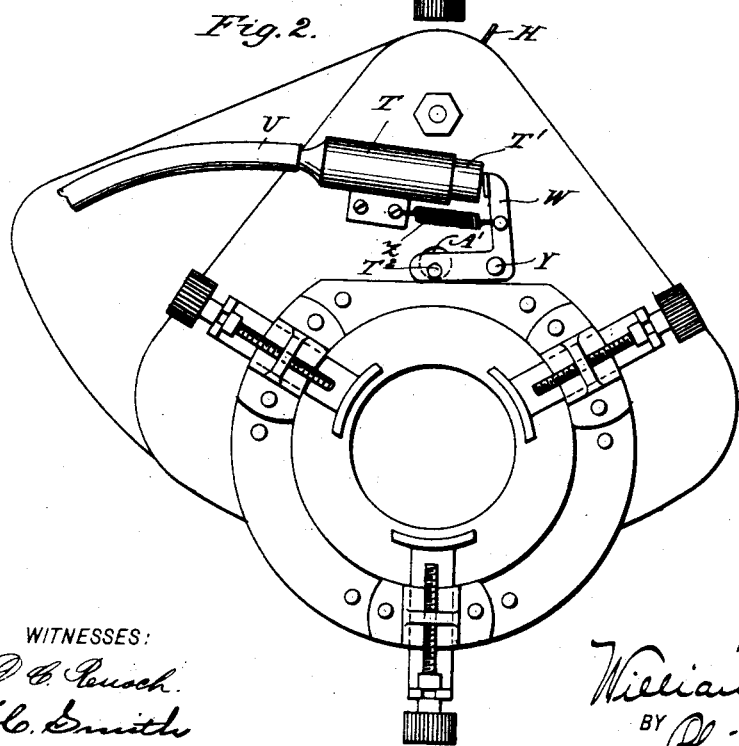
Figure 3:
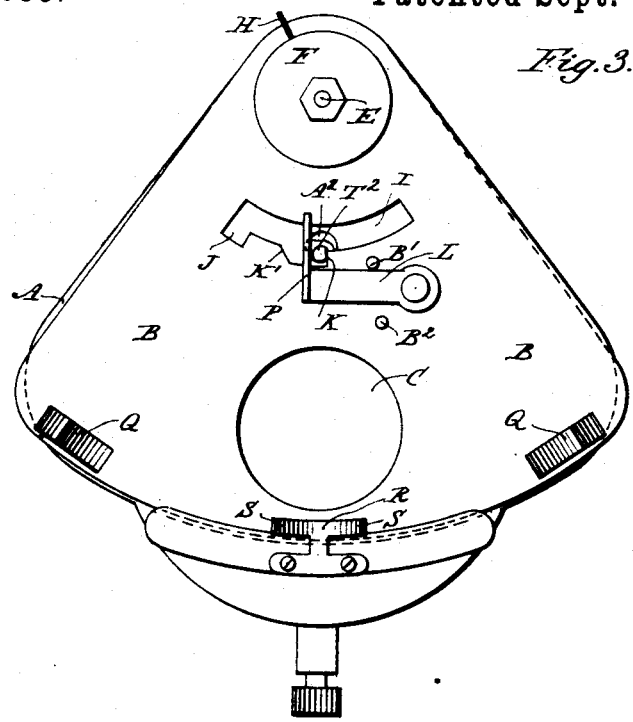
Figures 4, 5:
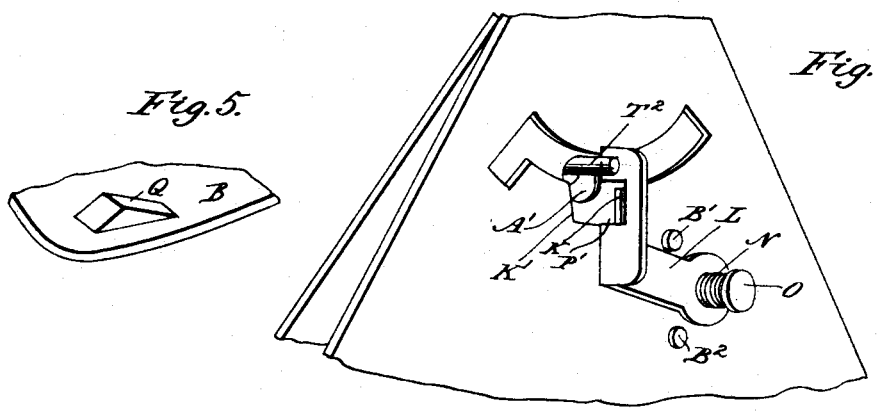
Figure 6:
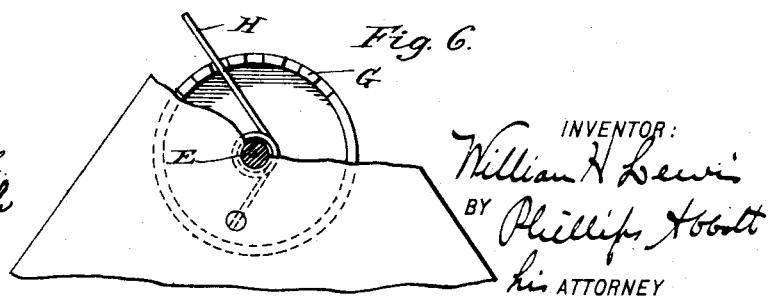

Figure 1 illustrates a front elevation of the apparatus, the shutter being set ready for a time exposure. Fig. 2 illustrates a rear elevation of the same. Fig. 3 illustrates a front elevation, the parts being shown in position during a time exposure. Fig. 4 is a perspective view showing the shutter being arrested by the engagement of the end of the bell-crank with the latch. Fig. 5 is a perspective view of one of the inclined stops on the shutter. Fig. 6 is a rear view of the upper part of the shutter partly broken away to show the spring and its inclosing-case.

A is the board or base to which the shutter is attached.

B is the shutter.

C is the exposure-aperture in the shutter.

D is the exposure-aperture in the base-board.

E is a pivot upon which the shutter oscillates.

F is a hollow case within which the spring which actuates the shutter is or may be contained.

G is a rack or series of teeth made in the flange or side of the case F, into which the free end H of the spring may be adjusted and by which it is held, thus increasing or decreasing the tension of the spring, as desired. The other end of the spring is fastened to the shutter.

I is a slot made in the shutter, having a recess or detent J at or near one end, and another K at or near the central part of the slot.

L is a latch pivoted at M to the shutter and provided with a friction device—such as a spring N—underneath the head O of the pivot, by which means the latch L will be pressed against the shutter and thus be held by friction in any position in which it may be left. Any other suitable means may be employed to effect this result. At its free end the latch is or may be bent at right angles, as shown at P, and a notch P' is made in it. (See Fig. 4.)

Q Q' are two blocks attached to the lower part of the shutter near the edges thereof. Their inwardly-presented faces are beveled, as shown.

R is a stop fastened to the base-board A or other suitable part of the device. It has outwardly-inclined ends S S, under which the inclined faces of the blocks Q Q' pass, and there jam when the shutter is at the two extremes of its movement, the effect of which is to press the shutter firmly against the base-board and prevent the passage of light.

T is a pneumatic engine, which may be the same as any now in use, there being various forms known.

U is the usual rubber or other tube which connects the engine with the usual rubber bulb or its equivalent.

W is a bell-crank or equivalent lever pivoted at Y to the base-board or other suitable part of the device.

Z is a spring attached at one end to the bell-crank W and at the other to the base-board or other rigid part. One end of the bell-crank engages with the piston T' of the engine and the other has a pin $T^2$, (or may itself be bent at right angles,) which passes through a hole A' in the base-board and also through the slot I in the shutter and projects, as seen best in Fig. 4, sufficiently beyond it to engage with the latch P when it is moved into its path.

B' $B^2$ are two stops on the shutter, which limit the movement of the latch L.

The operation of the apparatus is as follows: The spring is put under such tension as desired by engaging the free end of the spring H in the appropriate tooth or detent in the rack G. Then to set the shutter for an instantaneous exposure it is moved against the stress of the spring until the pin $T^2$ of the bell-crank W enters the detent J in the slot I of the shutter, and in order that there may be no interference with this movement of the shutter I bevel off or incline the rear edge K' of the detent K, so that the pin $T^2$ will automatically ride over it. When the shutter has been moved into the position in which the pin $T^2$ engages in the detent J and holds it there, the block Q has passed beneath the appropriate end S of the stop R, and the shutter is by it pressed down upon the base-board. To make the exposure, the bulb of the engine or equivalent device is actuated, the piston of the engine acts on the bell-crank W, the spring Z is extended, the pin $T^2$ is withdrawn from the detent J, and the shutter, being released, is quickly oscillated by the spring H, making the exposure during the coincidence of the exposure-apertures C and D in the well-known manner. The spring Z immediately returns the bell-crank W to its normal position.

To make a time exposure, the latch L is thrown over against the stop B', as shown in Fig. 1, and the shutter is again pressed over against the stress of its spring H until the pin $T^2$ again engages with the detent J. During this transit of the shutter the pin $T^2$ passes through the recess or notch P' in the latch. Now upon compressing the bulb the bell-crank W, acting as before, lifts the pin $T^2$ from the detent J and the spring H instantly carries the shutter to the left, and this takes place before the bulb can by any possibility be released, thus the pin $T^2$ comes in contact with the latch L at a point immediately above the notch P', as seen in Fig. 4. This momentarily prevents further movement of the shutter; but in a moment, the bulb being released or the engine leaking somewhat, the spring Z draws the bell-crank W backwardly toward its normal position until its pin $T^2$ passes through the notch P', and then the spring H attempts to continue the movement of the shutter to the left; but immediately the pin $T^2$ comes in contact with the square rear shoulder of the detent K, as shown in Fig. 3, and the shutter is by it locked in its then position, in which the apertures C and D are coincident. The time exposure is thus made, which being finished another compression of the bulb again lifts the pin $T^2$ out of the detent K in the same manner in which it was previously lifted from the detent J, and the shutter then completes its transit and all the parts return to their normal position when at rest.

It will be obvious to those who are familiar with this art that many modifications may be made in the details of construction and still my invention be practically employed. I do not therefore limit myself to the precise construction described and illustrated.

I claim—

1. In a camera-shutter, the combination of two stops to limit the movement of the shutter, having inclined surfaces located upon the shutter at points coincident with the extremes of its movement, whereby the shutter is pressed upon the base-board and the light excluded when at rest, and a spring to operate the shutter, substantially as set forth.

2. The combination of a pivoted shutter, a spring to actuate the shutter, a casing about the pivot, in which the spring is contained, a rack for adjusting the tension of the spring, and stops to limit the movement of the shutter, having inclined surfaces whereby the shutter is pressed upon the base-board, substantially as set forth.

3. The combination of a pivoted shutter, means to actuate a holding device adapted to engage with and hold the shutter, a spring to actuate the shutter inclosed in a casing provided with a rack for adjusting the tension of the spring, substantially as set forth.

4. The combination of a pivoted shutter, means to actuate a holding device adapted to engage with and hold the shutter, double stops on the shutter, adapted to engage with the holding device, and an adjustable latch attached to the shutter, adapted to be brought into contact with the holding device and to arrest the shutter until the holding device can engage with the second stop for the purposes of a time exposure, substantially as set forth.

5. The combination of a pivoted shutter, means to actuate a holding device which is adapted to engage with and hold the shutter, double stops on the shutter, adapted to engage with the holding device, an adjustable latch attached to the shutter, adapted to be brought into contact with the holding device until it can engage with the second stop for the purposes of a time exposure, and stops to limit the movement of the shutter, having inclined surfaces, substantially as set forth.

6. The combination of a pivoted shutter provided with a slot having double detents, a spring-actuated pawl or holding device adapted to engage with the detents in the slot, means to actuate the pawl against the stress of its spring, and a movable latch adapted to be engaged with the holding device and to temporarily arrest the movement of the shutter, substantially as set forth.

7. The combination of a pivoted shutter provided with a slot having double detents, a spring-actuated pawl or holding device adapted to engage with the detents in the slot, means to actuate the pawl against the stress of the spring, a movable latch adapted to be engaged with the holding device and to temporarily arrest the movement of the shutter, and a spring to actuate the shutter, inclosed in a casing provided with means whereby the tension of the spring may be adjusted, substantially as set forth.

8. In a shutter mechanism, the combination of a pivoted shutter provided with a slot having double detents, a pawl or holding device for the shutter, adapted to be engaged with both detents, a latch adapted to two positions, in one of which it will engage with the pawl or holding device and in the other it will not, substantially as set forth.

Signed at New York, in the county of New York and State of New York, this 6th day of February, A. D. 1890.

WILLIAM H. LEWIS.

Witnesses:
PHILLIPS ABBOTT,
FREDERICK SMITH.